(12) United States Patent
Chapman

(10) Patent No.: US 11,738,392 B1
(45) Date of Patent: Aug. 29, 2023

(54) FASTENING SYSTEMS, FASTENING METHODS, AND METHODS OF IMPREGNATING FASTENING COMPONENTS

(71) Applicant: John Eric Chapman, Gray, TN (US)

(72) Inventor: John Eric Chapman, Gray, TN (US)

(*) Notice: Subject to any disclaimer, the term of this patent is extended or adjusted under 35 U.S.C. 154(b) by 471 days.

(21) Appl. No.: 16/999,171

(22) Filed: Aug. 21, 2020

Related U.S. Application Data

(60) Provisional application No. 62/890,693, filed on Aug. 23, 2019.

(51) Int. Cl.
| | |
|---|---|
| F16B 1/00 | (2006.01) |
| B22F 3/26 | (2006.01) |
| F16B 39/22 | (2006.01) |
| F16C 17/10 | (2006.01) |
| F16C 3/02 | (2006.01) |
| F16H 55/00 | (2006.01) |
| F16C 7/00 | (2006.01) |
| F16C 33/14 | (2006.01) |
| F16B 37/00 | (2006.01) |
| F16B 35/00 | (2006.01) |
| F16B 39/01 | (2006.01) |

(52) U.S. Cl.
CPC ............... *B22F 3/26* (2013.01); *F16B 35/00* (2013.01); *F16B 37/00* (2013.01); *F16B 39/01* (2013.01); *F16B 39/225* (2013.01); *F16C 3/02* (2013.01); *F16C 7/00* (2013.01); *F16C 17/10* (2013.01); *F16C 33/145* (2013.01); *F16H 55/00* (2013.01)

(58) Field of Classification Search
CPC ........ F16B 39/225; F16B 35/00; F16B 37/00; B22F 3/23; F16C 17/10; F16H 55/00
USPC .................. 411/82.3; 428/550, 546
See application file for complete search history.

(56) References Cited

U.S. PATENT DOCUMENTS

| | | | | |
|---|---|---|---|---|
| 2,957,235 | A * | 10/1960 | Steinberg | B22F 7/062 55/498 |
| 3,007,822 | A * | 11/1961 | Kaiser | B22F 3/26 419/29 |
| 3,345,452 | A | 10/1967 | Logan et al. | |
| 3,913,990 | A * | 10/1975 | Eklund | B23P 6/00 384/208 |
| 4,014,802 | A | 3/1977 | Seino et al. | |
| 4,589,693 | A * | 5/1986 | Kennedy | G09F 3/0358 292/315 |
| 4,738,730 | A * | 4/1988 | Ferguson | B22F 3/24 148/318 |
| 4,797,251 | A | 1/1989 | Sakuramoto et al. | |
| 4,830,531 | A * | 5/1989 | Condit | F16B 37/045 403/348 |
| 5,016,425 | A * | 5/1991 | Weick | A61M 15/085 53/471 |
| 5,123,439 | A * | 6/1992 | Powers | F16K 27/0272 251/368 |
| 5,399,052 | A * | 3/1995 | Volkmann | F16B 19/1063 411/930 |

(Continued)

*Primary Examiner* — Gary W Estremsky
(74) *Attorney, Agent, or Firm* — Thomas M. Joseph, Esq.

(57) ABSTRACT

A fastening system including a first sintered powder metal fastening component and a second metal fastening component. The first sintered powder metal fastening component has a first porous surface and a one-part adhesive in the first porous surface. The second metal fastening component has a second surface. The second surface is configured to frictionally engage with the first porous surface.

20 Claims, 4 Drawing Sheets

(56) References Cited

U.S. PATENT DOCUMENTS

| | | | |
|---|---|---|---|
| 5,417,529 A * | 5/1995 | Volkmann | F16B 19/1063 |
| | | | 411/13 |
| 5,465,078 A * | 11/1995 | Jones, Jr. | B03C 1/286 |
| | | | 184/6.25 |
| 6,692,813 B1 | 2/2004 | Elder | |
| 7,857,193 B2 | 12/2010 | Ripley | |
| 9,550,349 B1 | 1/2017 | Larsen et al. | |
| 2005/0025405 A1* | 2/2005 | Tamaoka | G11B 19/2018 |
| | | | 384/107 |
| 2007/0154278 A1* | 7/2007 | Schramm | B23Q 16/001 |
| | | | 411/395 |

\* cited by examiner

FASTENING SYSTEMS, FASTENING METHODS, AND METHODS OF IMPREGNATING FASTENING COMPONENTS

CROSS REFERENCE TO RELATED APPLICATION

This application claims the benefit under 35 U.S.C. § 119(e) of U.S. Provisional Application No. 62/890,693 entitled "FASTENING SYSTEMS, FASTENING METHODS, AND METHODS OF IMPREGNATING FASTENING COMPONENTS" filed Aug. 23, 2019, which is incorporated herein by reference.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

In one embodiment, a fastening system includes: a first sintered powder metal fastening component having a first porous surface and a one-part adhesive in the first porous surface; and a second metal fastening component having a second surface, wherein the second surface is configured to frictionally engage with the first porous surface.

In an embodiment, a first sintered powder metal fastening component can be a nut and the second metal fastening component can be a bolt.

In another embodiment, the first sintered powder metal fastening component can be a bushing and the second metal fastening component can be a bearing.

In an embodiment, the second metal fastening component can be a sintered powder metal component.

In another embodiment, a fastening system includes: a first sintered powder metal fastening component having a first porous surface and a first part of a two-part adhesive system in the first porous surface; and a second metal fastening component having a second surface and a second part of the two-part adhesive system coated on the second surface of the second fastening component, wherein the second surface is configured to frictionally engage with the first porous surface.

In an embodiment, first sintered powder metal fastening component can be a nut and the second metal fastening component can be a bolt.

In another embodiment, the first sintered powder metal fastening component can be a bushing and the second metal fastening component can be a bearing.

In an embodiment, the second metal fastening component can be a sintered powder metal component.

In yet another embodiment, a method for impregnating a sintered powder metal fastening component includes: positioning the sintered powder metal fastening component in a vacuum chamber with a one-part adhesive or with a first part of a two-part adhesive system; and applying a vacuum to the vacuum chamber to remove air within a first porous surface of the sintered powder metal fastening component.

In an embodiment, the sintered powder metal fastening component can be a nut.

In an embodiment, the sintered powder metal fastening component can be a bushing.

In yet another embodiment, a method of fastening a first sintered powder metal fastening component to a second metal fastening component includes: frictionally engaging a first porous surface of the first sintered powder metal fastening component with a second surface of the second metal fastening component to expose a one-part adhesive impregnated within the first porous surface of the first sintered powder metal fastening component; and adhering the first sintered powder metal fastening component to the second metal fastening component by the one-part adhesive.

In an embodiment, first sintered powder metal fastening component can be a nut and the second metal fastening component can be a bolt.

In another embodiment, the first sintered powder metal fastening component can be a bushing and the second metal fastening component can be a bearing.

In an embodiment, the second metal fastening component can be a sintered powder metal component.

In yet another embodiment, a method of fastening a first sintered powder metal fastening component to a second metal fastening component includes: frictionally engaging a first porous surface of the first sintered powder metal fastening component with a second surface of the second metal fastening component to expose a first part of a two-part adhesive system impregnated within the first porous surface of the first sintered powder metal fastening component; and reacting a second part of the two-part adhesive system coated on the second surface of the second fastening component with the first part of a two-part adhesive system to adhere the first sintered powder metal fastening component to the second metal fastening component.

In an embodiment, first sintered powder metal fastening component can be a nut and the second metal fastening component can be a bolt.

In another embodiment, the first sintered powder metal fastening component can be a bushing and the second metal fastening component can be a bearing.

In an embodiment, the second metal fastening component can be a sintered powder metal component.

Other embodiments of the disclosed fastening systems will become apparent from the following detailed description, the accompanying drawings and the appended claims.

These and other features and advantages will be apparent from a reading of the following detailed description and a review of the appended drawings. It is to be understood that the foregoing summary, the following detailed description and the appended drawings are explanatory only and are not restrictive of various aspects as claimed.

DETAILED DESCRIPTION

This disclosure relates to the field of fastening systems, in particular fastening systems in which fastening components are adhered together.

The detailed description provided below in connection with the appended drawings is intended as a description of examples and is not intended to represent the only forms in which the present examples can be constructed or utilized. The description sets forth functions of the examples and sequences of steps for constructing and operating the examples. However, the same or equivalent functions and sequences can be accomplished by different examples.

References to "one embodiment," "an embodiment," "an example embodiment," "one implementation," "an implementation," "one example," "an example" and the like, indicate that the described embodiment, implementation or example can include a particular feature, structure or characteristic, but every embodiment, implementation or example can not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic can be implemented in connection with other embodiments, implementations or examples whether or not explicitly described.

Numerous specific details are set forth in order to provide a thorough understanding of one or more embodiments of the described subject matter. It is to be appreciated, however, that such embodiments can be practiced without these specific details.

Various features of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the spirit and scope of the claimed subject matter.

Figure 1:
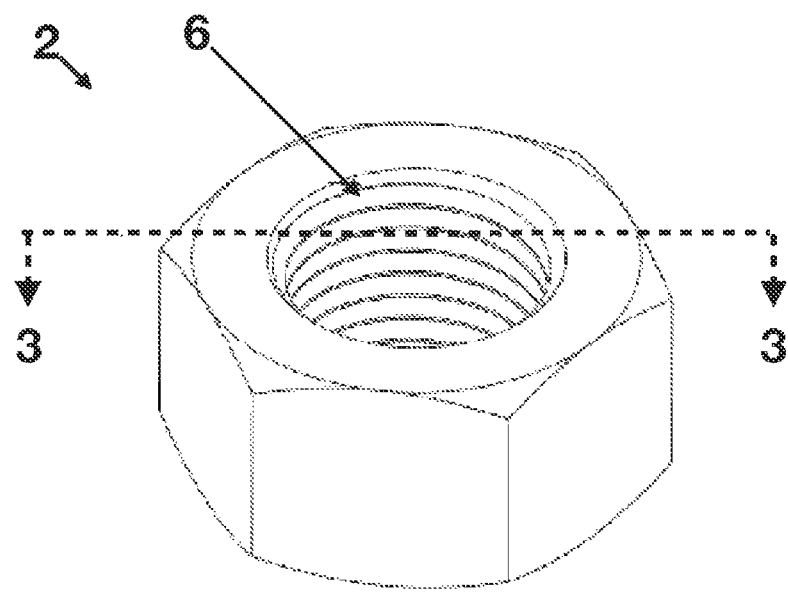
FIG. 1 is a perspective view of an exemplary first sintered powder metal fastening component according to an embodiment of the present description.
Figure 2:
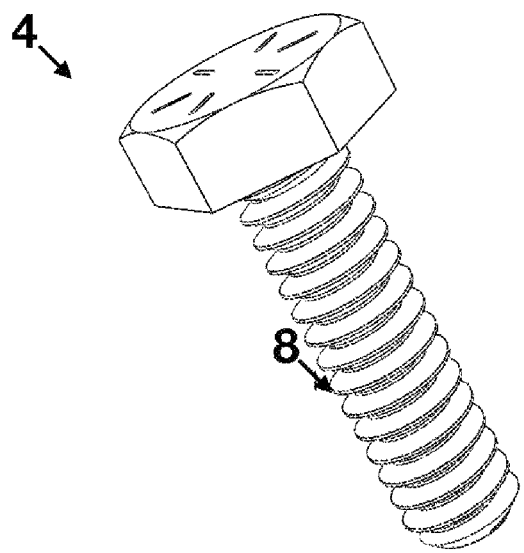
FIG. 2 is a perspective view of an exemplary second metal fastening component according to an embodiment of the present description.

Referring to the drawings and particularly to FIGS. 1 and 2, perspective views of an exemplary fastening system according to the present description are shown. FIG. 1 shows a first sintered powder metal fastening component 2, and FIG. 2 shows a second metal fastening component 4.

As shown in FIGS. 1 and 2, according to a non-limiting example, the first sintered powder metal fastening component 2 can be a nut and the second metal fastening component 4 can be a bolt. In another non-limiting example, the first sintered powder metal fastening component 2 can be a bushing and the second metal fastening component 4 can be a bearing. In yet another example, the first sintered powder metal fastening component 2 and the second metal fastening component 4 can be any form of cooperating fastening components having a first porous surface 6 of the first sintered powder metal fastening component 2 configured to engage with a second surface 8 of the second metal fastening component 4.

The first sintered powder metal fastening component 2 can be manufactured in any manner. In a non-limiting example, powder metal can be compacted into the overall shape of the first sintered powder metal fastening component 2. Then the powder metal can be sintered at sintering temperature less than a melting temperature to preserve a porosity of the resulting sintered powder metal. After sintering, the sintered powder metal can be optional heat treated and optionally plated. Then, a bore can be formed in the sintered powder metal by a machining operation, which can be threaded or unthreaded.

In a non-limiting example, the second metal fastening component 4 can be a sintered powder metal component. Alternatively, the second metal fastening component 4 can be formed by another method, such as by a forging method.

Figure 3:
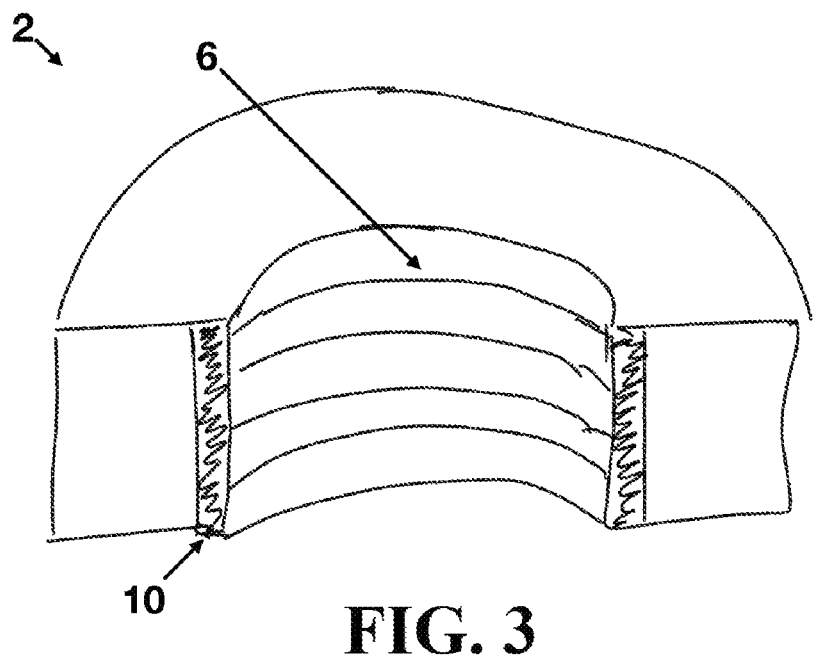
FIG. 3 is sectional perspective view of the first sintered powder metal fastening component of FIG. 1 taken along line 3-3.

Referring now to FIG. 3 with continuing reference to the foregoing figures, a section of the first sintered powder metal fastening component 2 of FIG. 1 is illustrated. The first sintered powder metal fastening component 2 has a first porous surface 6. As shown, the first porous surface 6 can be an interior facing surface of the first sintered powder metal fastening component 2. Alternatively, the first porous surface 6 can be an interior facing surface of the first sintered powder metal fastening component 2.

As shown in FIG. 3, the first sintered powder metal fastening component 2 has an adhesive 10 in the first porous surface 6. In a first example, the adhesive 10 can be a one-part adhesive. In a second example, the adhesive 10 can be a first part of a two-part adhesive system. When the adhesive 10 is a first part of a two-part adhesive system, the second metal fastening component 4 has a second part of the two-part adhesive system coated on the second surface 8.

The adhesive 10 can be impregnated within sintered powder metal fastening component by any method. In an exemplary method of the present description, the sintered powder metal fastening component can be positioned in a vacuum chamber with the one-part adhesive or with the first part of the two-part adhesive system. Then, a vacuum can be applied to the vacuum chamber to remove air within a first porous surface of the sintered powder metal fastening component. By removing air from the first porous surface, the adhesive 10 is coerced into being impregnated within sintered powder metal fastening component. An advantage of this method is that a large amount of sintered powder metal fastening components can be positioned in the vacuum chamber to be impregnated at the same time, thus resulting in production efficiencies. Another advantage of this method is that an interior facing surface of the first sintered powder metal fastening component 2 can be impregnated with the adhesive 10, for which it is otherwise difficult to impregnate. However, the present description is not limited to this method of impregnating the adhesive 10, and the other methods, such as gas impregnation, can be practiced.

When the first porous surface 6 of the first sintered powder metal fastening component 2 engages with the second surface 8 of the second metal fastening component 4, a frictional force created by the engagement of the first porous surface 6 and the second surface 8 exposes and heats the adhesive in the first porous surface 6. Thus, in the first example, the first sintered powder metal fastening component can be adhered to the second metal fastening component by the one-part adhesive from the first porous surface 6, and, in the second example, the second part of the two-part adhesive system coated on the second surface 8 of the second fastening component 4 is reacted with the first part of a two-part adhesive system to to adhere the first sintered powder metal fastening component 2 to the second metal fastening component 4.

The frictional engagement between the first porous surface 6 and the second surface 8 can be effected by a variety of configurations. In an exemplary embodiment, one or both of the first porous surface 6 and the second surface 8 can include serrations that push into the opposing surface.

It should be understood that the sintered power metal fastening component 2 and the metal fastening component 4 can be formed through any suitable metal forming process, such as a powder metal process that provides metal components with porosity. Suitable metal forming processes can include metal injection molding and laser sintering. Metal injection molding provides the ability to form components that have mold threads.

The sintered power metal fastening component 2 and the metal fastening component 4 can be joined together through any process that provides frictional heat, such as press fitting. In some embodiments, the frictional heat can be supplemented or replaced via brazing, welding, and/or with a blow torch.

In some embodiments, the second surface 8 can be formed as linear threads. The linear threads can line up in a similar manner as occurs in a square or star drive. The linear threads can be linear keyways.

It should be understood that the adhesive 10 can be activated by heat from an outside source in some embodiments. In other embodiments, the adhesive 10 can be activated from heat from a local source, such as friction from screw threads or pressing the first sintered powder metal fastening component 2 against the second metal fastening component 4. In yet other embodiments, one chemical can bind to another chemical. In other embodiments, an inert material can react to another material in the first sintered powder metal fastening component 2 or the second metal fastening component 4 (i.e., an adhesive that includes binding agent that is inert to steel, but adheres to copper once released).

The adhesive 10 can be a binding or adhesive agent, which can include compositions that chemically weld or mates two metals together to simulate the welding process. The adhesive 10 can also be effected by temperature to increase viscosity of the composition. Alternatively, the adhesive 10 can be a binding or adhesive agent that can include compositions that form bonds to both surfaces and to itself to join the first sintered powder metal fastening component 2 to the second metal fastening component 4. The adhesive 10 can include be acrylic, anaerobic, cyanoacrylate, epoxy, hot melt, silicone, urethane, or UV/light cured adhesive.

Figure 4:
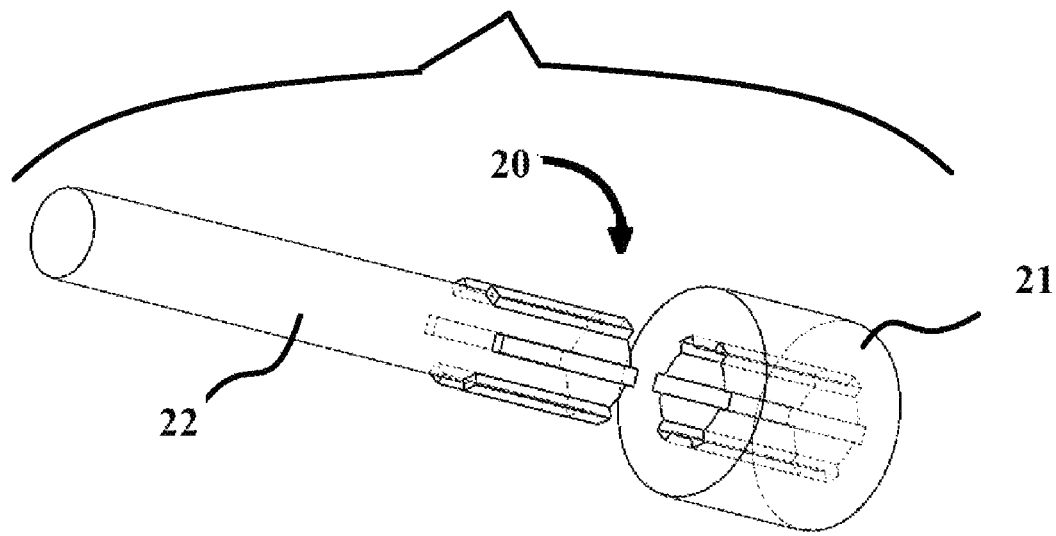
FIG. 4 is an exploded perspective view of another embodiment of an exemplary fastening component assembly according to an embodiment of the present description.

Referring now to FIG. 4 with continuing reference to the foregoing figures, another embodiment fastening component assembly, generally designated by the numeral 20, is shown. Unlike the embodiments shown in FIGS. 1-3, the fastening component assembly 20 includes two fastening components 21-22 that are formed from powder metal compositions embedded in a polymer matrix.

In this exemplary embodiment, the polymer matrix is a network polymer matrix that is formed from a thermoset resin, namely an epoxy resin. Like the embodiments shown in FIGS. 1-3, the two fastening components 21-22 can be joined with heat provided through friction. In other embodiments, the network polymer matrix can be formed from elastomers, plastomers, thermoplastic elastomers, composite materials, and other like materials.

Figure 5:
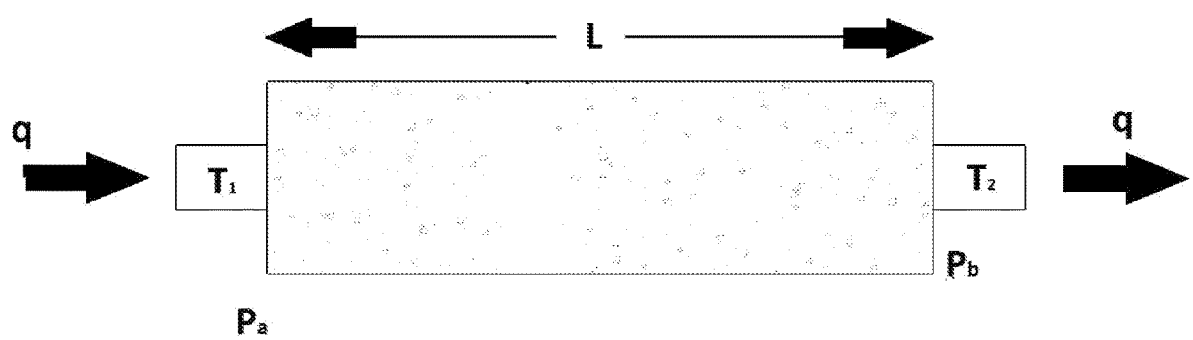
FIG. 5 is a schematic diagram of heat flux through a fluid.

Referring now to FIG. 5 with continuing reference to the foregoing figures, a schematic diagram of heat flux through a fluid is shown. The diagram can be used to understand how much heat to supply to joint components, such as the sintered power metal fastening component 2 and the metal fastening component 4 shown in FIGS. 1-3 and/or the two fastening components 21-22 shown in FIG. 4, when the components are heated with a torch or other heat source, using the following formula:

$$\phi_q = v \rho c_p \Delta T$$

where $\phi_q$ represents heat flux; v represents velocity; $\rho$ represents density; Cp represents heat capacity at constant pressure; and $\Delta T$ represents the difference in temperature.

In some embodiments, stage one satisfying conditions, which correspond to porous leeching conditions, can be determined. In other embodiments, it is known that epoxy will leech out under conditions when the Prandtl number, Pr, is less than one.

Figure 6:
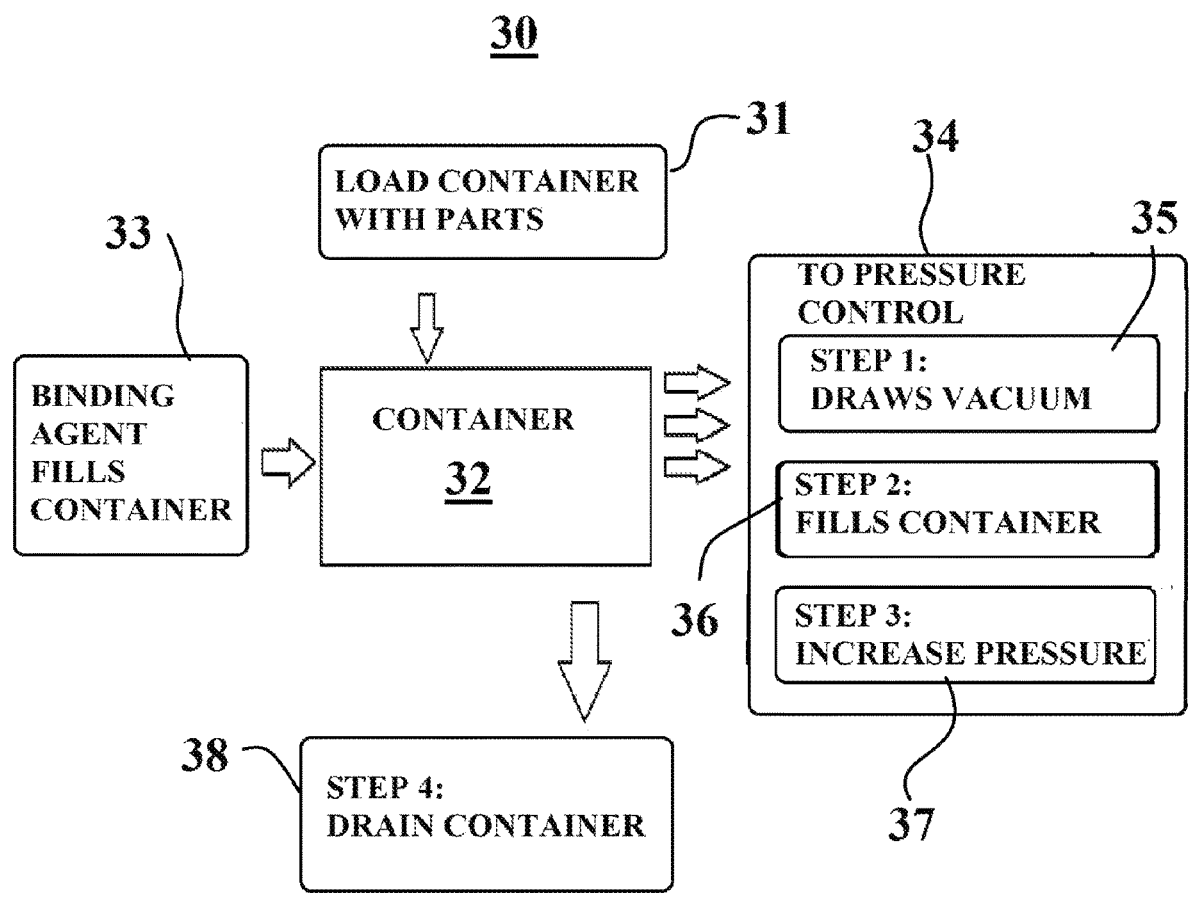
FIG. 6 is a schematic diagram of a process in accordance with an embodiment of the present description.

Referring now to FIG. 6, there is shown a process, generally designated by the numeral 30, for joining one component to another component with an adhesive. In this exemplary embodiment, the components can be the first sintered powder metal fastening component 2 and the second metal fastening component 4, shown in FIGS. 1-3 and/or the components 21-22 shown in FIG. 4. The adhesive can be the adhesive 10 shown in FIGS. 1-3.

At Step 31, the components are loaded into a container 32. Then, at Step 33, a binding agent, which can be an epoxy, is added to the container 33. Within the container 32, an inert or a reactive gas is used to cure the binding agent. The pressure within the container 32 is controlled by a pressure control 34.

At Step 35, a vacuum is drawn in the container 33. The container 33 holds the components, which can comprise porous metal parts, for a period of time to draw out any air that is contained within any pores in the components using vacuum pressure. Then, at Step 36, a reactive or inert gas fills the container 33.

At Step 37, pressure within the container 33 is increased using the reactive or the inert gas to further penetrate the components. Optionally, the temperature of the container 33 can be changed in order to increase or decrease the viscosity of the binding agent.

At Step 38, the container 33 can be drained, so that a joined part can be removed therefrom.

SUPPORTED FEATURES AND EMBODIMENTS

The detailed description provided above in connection with the appended drawings explicitly describes and supports various features of apparatus and methods for fastening powder metallurgy composite parts using heat generated through friction. By way of illustration and not limitation, supported embodiments include a fastening system comprising: a first sintered powder metal fastening component having a first porous surface and a one-part adhesive in the first porous surface; and a second metal fastening component having a second surface, wherein the second surface is configured to frictionally engage with the first porous surface.

Supported embodiments include the foregoing fastening system, wherein the first sintered powder metal fastening component is a nut and the second metal fastening component is a bolt.

Supported embodiments include any of the foregoing fastening systems, wherein the first sintered powder metal fastening component is a bushing and the second metal fastening component is a bearing.

Supported embodiments include any of the foregoing fastening systems, wherein the second metal fastening component is a sintered powder metal component.

Supported embodiments include any of the foregoing fastening systems, wherein at least one of the first sintered power metal fastening component and the second metal fastening component is formed from a powder metal process that provides the at least one of the first sintered power metal fastening component and the second metal fastening component with porosity.

Supported embodiments include any of the foregoing fastening systems, wherein at least one of the first sintered power metal fastening component and the second metal fastening component is formed from a metal forming process selected from the group consisting of metal injection molding and laser sintering.

Supported embodiments include any of the foregoing fastening systems, wherein at least one of the first sintered power metal fastening component and the second metal fastening component is a shaft.

Supported embodiments include any of the foregoing fastening systems, wherein at least one of the first sintered power metal fastening component and the second metal fastening component is a gear.

Supported embodiments include any of the foregoing fastening systems, wherein at least one of the first sintered power metal fastening component and the second metal fastening component is a connecting rod.

Supported embodiments include a kit, a method, an apparatus, and/or means for implementing any of the foregoing metal fastening systems or a portion thereof.

Supported embodiments include a fastening system comprising: a first sintered powder metal fastening component having a first porous surface and a first part of a two-part adhesive system in the first porous surface; and a second metal fastening component having a second surface and a second part of the two-part adhesive system coated on the second surface of the second fastening component, wherein the second surface is configured to frictionally engage with the first porous surface.

Supported embodiments include the foregoing fastening system, wherein the first sintered powder metal fastening component is a nut and the second metal fastening component is a bolt.

Supported embodiments include any of the foregoing fastening systems, wherein the first sintered powder metal fastening component is a bushing and the second metal fastening component is a bearing.

Supported embodiments include any of the foregoing fastening systems, wherein the second metal fastening component is a sintered powder metal component.

Supported embodiments include any of the foregoing fastening systems, wherein at least one of the first sintered power metal fastening component and the second metal fastening component is formed from a powder metal process that provides the at least one of the first sintered power metal fastening component and the second metal fastening component with porosity.

Supported embodiments include any of the foregoing fastening systems, wherein at least one of the first sintered power metal fastening component and the second metal fastening component is formed from a metal forming process selected from the group consisting of metal injection molding and laser sintering.

Supported embodiments include any of the foregoing fastening systems, wherein at least one of the first sintered power metal fastening component and the second metal fastening component is a shaft.

Supported embodiments include any of the foregoing fastening systems, wherein at least one of the first sintered power metal fastening component and the second metal fastening component is a gear.

Supported embodiments include a kit, a method, an apparatus, and/or means for implementing any of the foregoing fastening systems or a portion thereof.

Supported embodiments include a method for impregnating a sintered powder metal fastening component, the method comprising: positioning the sintered powder metal fastening component in a vacuum chamber with a one-part adhesive or with a first part of a two-part adhesive system; and applying a vacuum to the vacuum chamber to remove air within a first porous surface of the sintered powder metal fastening component.

Supported embodiments include the foregoing method, wherein the sintered powder metal fastening component is a nut.

Supported embodiments include any of the foregoing methods, wherein the sintered powder metal fastening component is a bushing.

Supported embodiments include a system, a kit, an apparatus, and/or means for implementing any of the foregoing methods or a portion thereof.

Supported embodiments include a method of fastening a first sintered powder metal fastening component to a second metal fastening component, the method comprising: frictionally engaging a first porous surface of the first sintered powder metal fastening component with a second surface of the second metal fastening component to expose a one-part adhesive impregnated within the first porous surface of the first sintered powder metal fastening component; and adhering the first sintered powder metal fastening component to the second metal fastening component by the one-part adhesive.

Supported embodiments include the foregoing method, wherein the first sintered powder metal fastening component is a nut and the second metal fastening component is a bolt.

Supported embodiments include any of the foregoing methods, wherein the first sintered powder metal fastening component is a bushing and the second metal fastening component is a bearing.

Supported embodiments include any of the foregoing methods, wherein the second metal fastening component is a sintered powder metal component.

Supported embodiments include a system, a kit, an apparatus, and/or means for implementing any of the foregoing methods or a portion thereof.

Supported embodiments include a method of fastening a first sintered powder metal fastening component to a second metal fastening component, the method comprising: frictionally engaging a first porous surface of the first sintered powder metal fastening component with a second surface of the second metal fastening component to expose a first part of a two-part adhesive system impregnated within the first porous surface of the first sintered powder metal fastening component; and reacting a second part of the two-part adhesive system coated on the second surface of the second fastening component with the first part of a two-part adhesive system to adhere the first sintered powder metal fastening component to the second metal fastening component.

Supported embodiments include the foregoing method, wherein the first sintered powder metal fastening component is a nut and the second metal fastening component is a bolt.

Supported embodiments include any of the foregoing methods, wherein the first sintered powder metal fastening component is a bushing and the second metal fastening component is a bearing.

Supported embodiments include any of the foregoing methods, wherein the second metal fastening component is a sintered powder metal component.

Supported embodiments include a system, a kit, an apparatus, and/or means for implementing any of the foregoing methods or a portion thereof.

Supported embodiments include a fastening system comprising: a first fastening component having a first porous surface and an adhesive compound in the first porous surface; and a second fastening component having a second surface, wherein the second surface is configured to frictionally engage with the first porous surface; wherein the first fastening component and the second fastening component are formed from powder metal compositions embedded in polymer matrixes; and wherein the adhesive compound has the ability to be activated, at least partially, by friction heat, to join the first fastening component to the second fastening component.

Supported embodiments include the foregoing fastening system, wherein the polymer matrixes are epoxy.

Supported embodiments include a kit, a method, an apparatus, and/or means for implementing any of the foregoing fastening systems or a portion thereof.

Supported embodiments include fastening systems and methods for joining components formed through powder metallurgy processes, including sintering, press-and-sinter, cold or hot isostatic pressing, direct powder rolling, forging, metal injection molding and gravity sintering, and other similar powder metal forming techniques.

The detailed description provided above in connection with the appended drawings is intended as a description of examples and is not intended to represent the only forms in which the present examples can be constructed or utilized.

It is to be understood that the configurations and/or approaches described herein are exemplary in nature, and that the described embodiments, implementations and/or examples are not to be considered in a limiting sense, because numerous variations are possible.

The specific processes or methods described herein can represent one or more of any number of processing strategies. As such, various operations illustrated and/or described can be performed in the sequence illustrated and/or described, in other sequences, in parallel, or omitted. Likewise, the order of the above-described processes can be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. A fastening system comprising:
    a first metal fastening component having a first porous surface and a one-part adhesive in the first porous surface, and
    a second metal-fastening component having a second surface, wherein the second surface is configured to frictionally engage with the first porous surface,
    wherein the one-part adhesive can be activated at least partially, by friction heat, to join the first metal fastening component to the second metal fastening component.

2. The fastening system of claim 1, wherein the one-part adhesive is impregnated into the first porous surface.

3. The fastening system of claim 1, wherein the first sintered powder metal fastening component is a bushing and the second metal fastening component is a bearing.

4. The fastening system of claim 1, wherein the first porous surface and the second surface comprises serrations that allows the first porous surface to push into the second surface.

5. The fastening system of claim 1, wherein one-part adhesive can be activated by heat from an outside source.

6. The fastening system of claim 1, wherein at least one of the first metal fastening component and the second metal fastening component is formed from a metal forming process selected from the group consisting of metal injection molding and laser sintering.

7. The fastening system of claim 1, wherein the second surface is formed as linear threads.

8. The fastening system of claim 1, wherein at least one of the first metal fastening component and the second metal fastening component is a gear.

9. The fastening system of claim 1, wherein the first metal fastening component is formed from a first material, the second metal fastening component is formed from a second material, the one-part adhesive is inert to the first material and reactive to the second material.

10. The fastening system of claim 1, wherein at least one of the first sintered power metal fastening component and the second metal fastening component is a gear.

11. The fastening system of claim 1, wherein the first metal fastening component is formed from a first material, the second metal fastening component is formed from a second material, the one-part adhesive is inert to the first material and reactive to the second material.

12. A fastening system comprising:
    a first metal fastening component having a first porous surface and a first part of a two-part adhesive system in the first porous surface, and
    a second metal fastening component having a second surface and a second part of the two-part adhesive system coated on the second surface of the second fastening component, wherein the second surface is configured to frictionally engage with the first porous surface,
    wherein the first part and the second part of a two-part adhesive can be activated, at least partially, by friction heat, to join the first metal fastening component to the second metal fastening component.

13. The fastening system of claim 12, wherein the first part of a two-part adhesive is impregnated into the first porous surface and the second part of a two-part adhesive is impregnated into the second porous surface.

14. The fastening system of claim 12, wherein the first sintered powder metal fastening component is a bushing and the second metal fastening component is a bearing.

15. The fastening system of claim 12, wherein first porous surface and the second surface comprises serrations that allows the first porous surface to push into the second surface.

16. The fastening system of claim 12, wherein the first part of the two-part adhesive and the second part of the two-part adhesive can be activated by heat from an outside source.

17. The fastening system of claim 12, wherein at least one of the first metal fastening component and the second metal fastening component is formed from a metal forming process selected from the group consisting of metal injection molding and laser sintering.

18. The fastening system of claim 12, wherein the second surface is formed as linear threads.

19. A fastening system comprising:
    a first fastening component having a first porous surface and an adhesive compound in the first porous surface; and
    a second fastening component having a second surface, wherein the second surface is configured to frictionally engage with the first porous surface;
    wherein the first fastening component and the second fastening component are formed from powder metal compositions embedded in polymer matrixes;

wherein the adhesive compound has the ability to be activated, at least partially, by friction heat, to join the first fastening component to the second fastening component.

20. The fastening system of claim 19, wherein the polymer matrixes are epoxy.

\* \* \* \* \*